United States Patent
Kowalick

[11] Patent Number: 5,877,707
[45] Date of Patent: Mar. 2, 1999

[54] GPS BASED SEAT BELT MONITORING SYSTEM & METHOD FOR USING SAME

[76] Inventor: Thomas M. Kowalick, 560 E. Massachusetts Ave., Southern Pines, N.C. 28387

[21] Appl. No.: 785,590

[22] Filed: Jan. 17, 1997

[51] Int. Cl.[6] ................................................... G08G 1/123
[52] U.S. Cl. ...................... 340/988; 340/439; 340/457.1
[58] Field of Search .................................... 340/988, 457, 340/457.1, 436, 438, 439; 280/801.1; 180/273, 268, 271

[56] References Cited

U.S. PATENT DOCUMENTS

| | | | |
|---|---|---|---|
| 3,112,467 | 11/1963 | Benning | 340/457.1 |
| 3,504,336 | 3/1970 | Bablitz | 340/457.1 |
| 3,864,668 | 2/1975 | Bickford | 340/452.1 |
| 4,369,426 | 1/1983 | Merkel | 340/436 |
| 4,849,733 | 7/1989 | Conigliaro et al. | 340/457.1 |
| 4,992,943 | 2/1991 | McCracken | 340/436 |
| 5,119,407 | 6/1992 | Ozmeral | 340/457.1 |
| 5,253,115 | 10/1993 | Ueno | 340/475 |
| 5,394,955 | 3/1995 | Howard | 180/273 |
| 5,430,432 | 7/1995 | Camhi et al. | 340/438 |
| 5,439,249 | 8/1995 | Steffens, Jr. et al. | 280/235 |
| 5,504,482 | 4/1996 | Schreder | 340/988 |
| 5,721,540 | 2/1998 | Ellis | 340/988 |

FOREIGN PATENT DOCUMENTS 1281791 7/1972 United Kingdom .

*Primary Examiner*—Brent A. Swarthout
*Attorney, Agent, or Firm*—Joanne Denison; Denison & Assocs

[57] ABSTRACT

The present invention consists of a seat belt usage monitoring system which strongly encourages seat belt usage by providing a GPS receiver; a system for detecting seat belt usage by the driver and/or occupants of a vehicle which consists of a infrared emitter and receiver with retro-reflective material mounted or embedded within the seat belt shoulder harnesses; erasable, encodable storage means for recording duration of seat belt use, location at time of crash or collision, duration of travel, direction, velocity and time of travel, all of which is contained in a black box, wherein the data may be downloaded after an accident by law enforcement personnel. In such a manner, accident liability may be better determined, insurance rates could be lowered for the owner of the vehicle if it is shown seat belts were used consistently, but most important, the owner/driver of a vehicle is strongly compelled to buckle up and require all passengers to do likewise thereby reducing deaths and injuries.

11 Claims, 2 Drawing Sheets

5,877,707

GPS BASED SEAT BELT MONITORING SYSTEM & METHOD FOR USING SAME

FIELD OF THE INVENTION

The present invention relates to the area of seat belt usage monitoring systems accident information gathering systems, seat belt use detection devices, devices intended to passively encourage seat belt usage, and more specifically to a device which can detect seat belt usage of the vehicle occupants, record such usage in real time data into a black box for later retrieval by law enforcement personnel by obtaining information from the Global Positioning System ("GPS"), and record the time and direction of travel at the time of an accident, and which further can display a light indicator both out the front and rear of the vehicle, thus passively encouraging seat belt usage.

BACKGROUND OF THE INVENTION

Although it is well known and extensively documented that seat belt usage saves millions of dollars in medical expenses, lost time at work, and perhaps most importantly, saves thousands of lives each month in the U.S. Alone, many people do not use seat belts because they refuse to take the time or they simply forget to use them. For example, a publication from the U.S. Department of Transportation from Feb. 15, 1996 disclosed that while the average health care cost for a belted driver in an accident was $110, for a non-belted driver it was $562. For victims who required hospital stays, the costs were $9,000 for a belted driver and $14,000 for a non-belted driver. (Document may be found at http://www.dot.gov/affairs/index.htm). Hence, it is extremely important to encourage seat belt usage. Although others have created devices in attempt to meet this objective, they have failed to achieve acceptable usage rates. All devices seen in the prior have failed because they could not achieve the combination of results that would be necessary to achieve the highest rate possible of seat belt usage. The National Highway Traffic Safety Administration ("NHTSA") cites that wearing a seat belt is the single most important action that people can take to protect themselves from an accident. A recent NHTSA study concluded that 3 of every 5 motorist fatalities could have been avoided with the use of a safety belt. The health care costs of motor vehicle crashes is a national financial burden that must be reduced. Motor vehicle crashes remain a major public health problem for the nation as a whole. They are the number one cause of death and serious injury for young people ages 5 to 27 years. Data from the National Safety Council (Accident Facts, National Safety Council, 1995, p78) cites that motor vehicle deaths increased three percent from 1994 to 1995, mileage increased two percent, the number of registered vehicles increased one percent from 1994, while the population death rate increased two percent. Thus, there were 43,000 deaths, 2,300,000 disabling injuries and a cost of $170.6 billion dollars to society. This cost includes wage and productivity losses, medical expenses, administrative expenses, motor-vehicle property claims and employer costs. This enormous cost burden is a national problem, one that urgently needs to be solved. Unlike all prior devices, and regardless of the greater number of airbags in the vehicle fleet, for the third straight year in a row, the number of motor vehicle deaths and injuries has increased. This trend needs to be reversed.

Any device which could accurately monitor and document seat belt use would be of great value to insurance companies who can pass on a portion of their savings to consumers. Additionally, a device which can record information regarding vehicle travel such as direction of travel, duration of travel, speed of travel, and of course, seat belt usage during travel, could provide the government and insurance companies with invaluable information regarding vehicle usage and types and occurrences of accidents. And, a device which could display seat belt usage through the front windshield when all vehicle occupants are buckled up, could effectively and passively encourage seat belt use because a driver and vehicle occupants would note the large number of "complying" vehicles coming towards them. Peer pressure is a great source of behavior modification. Of course, a device which could display seat belt usage through the rear windshield would alert law enforcement personnel to the fact that not all vehicle occupants are buckled up, and they may be able to pull over the vehicle to ticket the driver. And finally, because many seat belt usage detection systems can be fooled by sitting on top of a seat belt, it would be useful to have an improved system seat belt detection system which is virtually foolproof.

There is also currently much interest in passively encouraging seat belt usage by providing constant audible warning signals and visible warning signals that a seat belt is not in use. For example, U.S. Pat. No. 4,849,733 issued to Conigliaro et. al, discloses an electrical system for providing an audible or visible warning and interior and exterior visible displays indicating whether the occupants of a motor vehicle have fastened their seat belts, in compliance with legal requirements. In such a manner, the vehicle occupants know that law enforcement personnel are readily alerted to the lack of seat belt usage, and since many states require seat belts to be worn, it is anticipated that all occupants will buckle up to avoid a traffic ticket. In some states, referred to as "primary seat belt usage" states, a vehicle can be stopped by police sole for lack of seat belt use. However, in "secondary seat belt usage" states, the vehicle must be stopped for another reason, and then if an occupant is not wearing a seat belt, a citation can issue for this offense.

However the Conigliaro system utilizes common belt latch sensors which may be defeated by sitting on the lap belt. Also, there is no on-going monitoring of whether the driver and the occupants regularly utilizes the seat belts, or if they only occasionally use the seat belts. As noted above, accidents are much more costly in terms of medical expenditures when a vehicle occupant does not wear a seat belt at the time of a collision. Thus, it behooves the driver, who is also generally the insurance purchaser to encourage vehicle occupants to utilize seat belts, nothing seen in the prior art readily accomplishes this result. Moreover, the Conigliaro system must be hard wired into the vehicle and it required constant maintenance. Furthermore it could not be readily used in any after market vehicles, which is a key desirable advantage in any seat belt monitoring system.

One patent, U.S. Pat. No. 5,394,955 issued to Howard encourages vehicle occupants to utilize their seat belts by deactivating circuit controls which provide power to occupant comfort and convenience features of the automobile, including the radio, audio and heating/cooling system. The automobile will continue to function if the seat belts are not used, but at a generally undesirable loss of comfort and convenience features. Seat belt use will therefore be encouraged as it is less uncomfortable to use the seat belts than to omit their use, but the incentive to regularly use seat belt is still not strong, and the device still lacks a passive feature, which is sought by the National Highway Traffic Agency so that drivers can turn off the system, as desired. Moreover, and perhaps most importantly, the Howard device has the inadvertent effect of at least in some instances, actually decreasing motoring safety. For example, if the radio does not function, a driver cannot be altered to dangerous traffic conditions or adverse weather warnings, such as icing and hurricanes. Additionally, fog could build up on the inside of the vehicle glass, creating very dangerous visual limitations.

In yet another issued patent, U.S. Pat. No. 5,119,407, issued to Ozmeral there is disclosed a seat belt monitoring system wherein a separate odometer is provided in the vehicle which is functional only when all the vehicle occupants use their seat belt. If the odometer reading, after a period of time, is fairly close to total miles traveled, this information can be used to decrease the insurer's insurance rates. This system still lacks a mechanism for recording and relaying information regarding seat belt usage during a collision, and does not provide any information regarding collision liability.

There are many patents which utilize GPS ("Global Positioning Systems") for a wide variety of purposes, including the tracking and retrieval of stolen vehicles, but there are none seen that monitor and track seat belt usage by the occupants of a vehicle. GPS is well known in the art and currently consists of a constellation of 24 satellites positioned around the earth which are operated by the US Department of Defense. They provide travelers with a constant fix on their locations. Air and sea pilots extensively use the system for navigation and such usage is well known in the prior art. A standard GPS receiver may obtain longitude and, latitude, velocity, direction of travel and absolute time. Although the signal is corrupted by the US government so that it is degraded to an accuracy of only 76 meters, there are numerous methods to correct the degradation to provide location information to come up with a revised position accurate to about 1 meter. There are additional methods to fine tune even this inaccuracy to a few millimeters. There are existing automobile navigation systems which, while not yet popular in the US, are in use in new vehicles in Japan.

These and other patents disclose a variety of systems regarding seat belt monitoring systems, systems which encourage seat belt usage, and the like, but nothing seen in the prior art can 1) record, in real time, seat belt usage, speed, duration and direction of travel by utilizing Global Positioning System ("GPS") technology; 2) detect seat belt usage using IR technology, making it difficult or impossible for the driver or vehicle occupants to fool the seat belt usage detection system; and, 3) display both through the front and rear windshields indicator lights which relate if the vehicle occupants are using their seat belts properly.

Also, in recent months there has been a great deal of concern regarding the safety of air bags where children or small women are concerned. As a result, it is anticipated that the driver and/or passenger will soon be able to disconnect his or her air bag, as desired. If and when this occurs, there will be an overwhelming concern to encourage proper seat belt use at all times, objectives which can be easily be met by the present invention. Further, it is well established that air bags are most effective in preventing injury or death when used in conjunction with seat belts. And, when injury has occurred from air bags, it is often associated with placement of the face or chest too close to the area of deployment. When seat belts are in use, they encourage vehicle occupants to sit back away from the area where air bags deploy from.

SUMMARY OF THE INVENTION

The present invention consists of a Global Positioning System ("GPS") seat belt monitoring system with four basic components: 1) a real time data recording system which records speed and direction of travel with a GPS based microprocessor, which information is kept in a black box and the electronic contents of which are downloaded by law enforcement personnel after an accident; 2) an improved seat belt usage detection system which utilizes infrared ("IR") signals to determine if the driver and occupants of the vehicle are using their seat belts by reflecting an IR signal off of an infrared retro-reflective sensor on the shoulder harness webbing back to an IR detector; 3) a seat belt usage exterior display system which sends an indicator light through the front windshield so that the vehicle occupants are encouraged to use their own seat belts because they see most all of the oncoming traffic has a visible light in the front windshield indicating all of those vehicle occupants are using their seat belts, thus very efficiently passively encouraging seat belt use via peer pressure; and 4) an optional rear display indicator system which displays an indicator light which may be seen both inside the vehicle cabin and through the rear windshield so occupants inside the vehicle can be reminded to buckle-up, and simultaneously that law enforcement personnel can be alerted to the fact the some or all of the vehicle occupants are not wearing seat belts, as required by law. This is important during the night and at low level light conditions. Currently, law enforcement personnel cannot enforce primary seat belt laws and ticket drivers for not using seat belts during such conditions because they cannot see well enough to determine if the driver and/or vehicle occupants are all buckled up. With a rear indicator light projecting from inside the vehicle this would be quite possible.

In a preferred embodiment of the present invention, a GPS monitor, such as those readily available in the marketplace by manufacturers such as Rockwell and Motorola is coupled to a microprocessor and mounted behind the rear view mirror of a vehicle, so as not to obstruct the drivers vision in any manner. Two stout, square antenna elements are mounted on the distal portion of the device, nearest the windshield, and two stout, square antenna elements are located on the proximal end of the device terminating near the top of the rear view mirror for optimal GPS reception. At the tip of one of the proximal antenna is an optional rear indicator light, preferably an LED or laser element which signals both inside and through the rear of the vehicle that signifies if vehicle occupants are currently using seat belts. This enables law enforcement personnel to readily determine seat belt usage for purposes of issuing a warning or a ticket to the driver. At the tip of the other proximal antenna, is an optional button which allows the driver the option to turn off the rear light regardless, so that law enforcement personnel will not know if the device is in use. This decision will be recorded as real time data. Hopefully, a driver will find it is easier to regularly use a seat belt rather than take the effort to turn on the rear indicator light each time the vehicle is used.

It is important to also seal the area around the distal mounting surface of the device such that the forward indicator light will not create glare or reflections in the vehicle, thus possibly distracting the driver. Such a technique is readily seen where a center rear brake light is used which is mounted on the inside of the rear windshield, and is commonly known in the art.

The two distal antenna also serve as mounting components for the device, wherein one of their surfaces may be coated with a strong adhesive by the car or device manufacturer so that the new rear view mirror/seat belt monitoring system can be attached to the front windshield. This is the same technique which is currently used to mount the stem portion of existing rear view mirrors to the interior of the front windshield glass.

Extending into the interior surface of the vehicle, in a location normally occupied by the standard rear view mirror mounting stem, will be the black box, or the gut of the systems itself. It is anticipated that the black box will contain a microprocessor, a removable memory module which contains a meg or more of encodable erasable programmable memory (EEPROM) to store real time data, and GPS circuitry which can locate one of a plurality of satellites located in the sky and obtain from the satellite the position of the vehicle, the direction and speed of travel, and of course, seat belt usage by the occupants of the vehicle. It is anticipated that the EEPROM containing the vital information will be placed in a separate unit which is easy to remove at the time of an accident, so that accurate and vital information concerning the accident, as well as a history of seat belt usage for the vehicle, may be relayed to law enforcement personnel for later analysis.

Also mounted at the distal end of the black box will be a forward indicator light which is preferably made of a neon light cell for durability and visibility from oncoming traffic. It is known in the art that a neon light cell or bulb can easily last twenty years or more and neon light bulbs require a modicum of power to operate. In a preferred embodiment of the invention, the neon light cell will be coupled to a photovoltaic cell which can detect light conditions (daylight, dark night, well lit night, etc.) and correct the intensity of the neon light cell accordingly. A preferred color for the neon light cell is blue, for its long wavelength which is easy to detect in a wide variety of lighting conditions, and also for the fact that it is a restful, non-irritating color. The forward indicator light will glow only when all seat belts are in proper use, and can be readily viewed by oncoming traffic. Since according to a recent report by the National Transpiration Highway Safety Administration (NHSTA) approximately 66% of all drivers use seat belts, the driver and the vehicle occupants will be reminded to buckle up because they will see an oncoming stream of blue lights. It is fully anticipated that when usage of the invention is as near to 100% as possible, it may be that oncoming drivers will flash their headlights to indicate to a forgetful driver or passenger to buckle up, as is commonly now done when someone forgets to turn on their headlights.

The system also preferably employs an IR seat belt usage detection system wherein a wide angle IR emitter is positioned on the central proximal portion of the black box and it emits a signal which may be reflected off the seat belt shoulder harness portion, when it is in proper position, back to an wide angle IR detector which is positioned directly adjacent the IR emitter on the device itself. In such a manner, a signal will be sent to a "hot spot" on the seat belt, and the detector will determine if the seat belt is used by calculating the proper angle expected to be reflected back to the IR detector. Thus, the device can pinpoint and detect if the front left seat belt is being used, the right seat belt is being used, etc. Further IR detectors and emitters may be used by positioning the same in the rear center of the vehicle on the ceiling for rear seats, or even third seats, if desired. Additional IR retro-reflectors may be mounted in the center back portion of each seat to determine whether someone is actually sitting in the seat. After the IR detector/emitter has determined proper seat belt usage, this information is automatically relayed back to the microprocessor to turn on or off the front and rear seat belt usage indicator lights, as warranted.

The retro-reflective surface for the seat belt webbing may be either added to the shoulder belt by adhesion or sewing, for an after market device, or it may be simply woven into the material where the GPS seat belt monitoring system supplied by an Original Equipment Manufacturer ("OEM") in a new vehicle.

As may be noted from this disclosure, of course the GPS Based Seat Belt Monitoring System may be either made as OEM direct from the vehicle dealer in new vehicles from the factory, or it may be relatively inexpensively added to the vehicle after manufacture. Of course, the incentive to add such an after market device to a vehicle would be the decrease in insurance premiums attached to addition of a device, when the vehicle owner makes it a habit to always buckle up and require all vehicle occupants to buckle up. Certainly, if and when laws are enacted to reduce or curtail medical expenses in collisions, as has been accomplished in Ontario, Canada, where the victim has not buckled up, the device will be a virtual necessity. It has been determined that the vast majority of vehicle occupants will buckle up, when requested to do so by the driver. Compliance should be even greater when the driver explains that reduced insurance premiums are the goal and/or, that medical expenditures during a collision will not be covered by insurance.

An additional feature of the GPS based seat belt monitoring system is that it will also encourage young children to get buckled up and remain buckled up during the entire car trip. It is well known among parents that children, and young children especially, are prone to remove seat belts unless constantly monitored. The present invention is very capable of serving as a constant warning to children to buckle up.

Currently, there are no existing seat belt warning systems that function during the entire period of time a vehicle is operational. Although a driver and/or passenger may enter or leave the vehicle numerous times after a vehicle has been turned on, such as when refueling the vehicle, there are no warning systems which remind the vehicle occupant to buckle up upon reentry. The present invention easily eliminates this problem, with continual monitoring of seat belt fastening status by all occupants of the vehicle.

OBJECTS OF THE INVENTION

Hence, it is a primary object of the instant invention to provide a GPS based seat belt monitoring system which can record in real time, vehicle direction, speed and seat belt usage into a black box for future retrieval by law enforcement personnel at the time of a collision.

It is a further primary object of the present invention to provide a GPS based seat belt monitoring system which utilizes IR technology to determine if the driver and/or occupants of the vehicle are using their seat belts by reflecting an IR signal off the shoulder harness webbing back to an IR detector.

It is a further primary object of the present invention to provide a GPS based seat belt monitoring system which has a forward indicator light, which can positively influence a driver and passengers to use their own seat belts because they see most all of the oncoming traffic has a visible light in the front windshield indicating that the occupants of those vehicles are properly using their own seat belts, hence effectively passively encouraging seat belt use via peer pressure.

It is a further primary object of the present invention to provide a GPS based seat belt monitoring system which has an optional rear display indicator system projecting from within the cabin of the vehicle which displays a rear facing indicator light through the rear windshield so that occupants within the vehicle are reminded to buckle-up, and also that law enforcement personnel can be reliably alerted to the fact that some or all of the vehicle occupants are not wearing seat belts, as required by law.

It is a further primary object of the present invention to provide a GPS based seat belt monitoring system with a forward facing front display indicator light which, in one preferred embodiment of the invention, consists of a blue neon light for ease of visibility and durability.

It is a further primary object of the present invention to provide a GPS based seat belt monitoring system with a forward facing front display indicator light consisting of a neon light bulb which is coupled to a photovoltaic cell wherein the intensity of the neon light is automatically varied to suit lighting conditions.

It is yet a further primary object of the present invention to provide a GPS based seat belt monitoring system which is coupled to a relatively large memory of approximately one meg or more which can be downloaded after an accident so that law enforcement personnel and insurance companies can gather information regarding the accident for purposes of determining liability or reducing insurance premiums where seat belt usage in the vehicle had been relatively consistent.

It is a further primary object of the present invention to provide a GPS based seat belt monitoring system which is passive in nature, wherein the driver can push a button and turn off the rear indicator light regardless of whether all seat belts were being used, but nonetheless the driver may find it more advantageous to simply require everyone to buckle up.

It is yet a further primary object of the present invention to provide a GPS based seat belt monitoring system with a forward facing indicator light having appropriate sealing around the distal mounting surface of the device so that the driver is not possibly distracted from glare or reflections in the vehicle.

It is still a primary object of the present invention to provide a GPS based seat belt monitoring system having four antenna with two conveniently serving as mounting means to mount the device behind the rear view mirror to the interior of the front windshield so that the device does not obstruct the driver's view.

And it is a further primary object of the present invention to provide a GPS based seat belt monitoring system with a black box having a separately readily removable unit which contains stored data concerning absolute time, vehicle speed, direction and seat belt usage which be downloaded at a later date.

It is a further object of the present invention to provide a seat belt usage monitoring system wherein an IR emitter is positioned next to an IR receiver on the central proximal portion of the black box and it emits a signal which may be reflected off the seat belt when it is properly used.

It is a further object of the present invention to provide an seat belt usage monitoring system wherein seat belt shoulder harnesses are provided with either retro-reflective material which is glued or sewn thereto, or in the case of an OEM system, woven directly into the seat belt material for the purpose of reflecting IR signals back to an IR detector.

It is a further object of the present invention to provide a GPS based seat belt monitoring system which requires no wiring to the seat belt to detect seat belt usage.

It is a further object of the present invention to provide a GPS based seat belt monitoring system which utilizes GPS technology which is becoming much less expensive to install either in a new vehicle, or after market in an existing vehicle, than paying increased medical expenses for collisions where the occupants are not buckled in properly.

These and other objects and advantages of the present invention can be readily derived from the following detailed description of the drawings taken in conjunction with the accompanying drawings present herein and should be considered as within the overall scope of the invention.

DETAILED DESCRIPTION OF THE DRAWINGS

Figure 1:
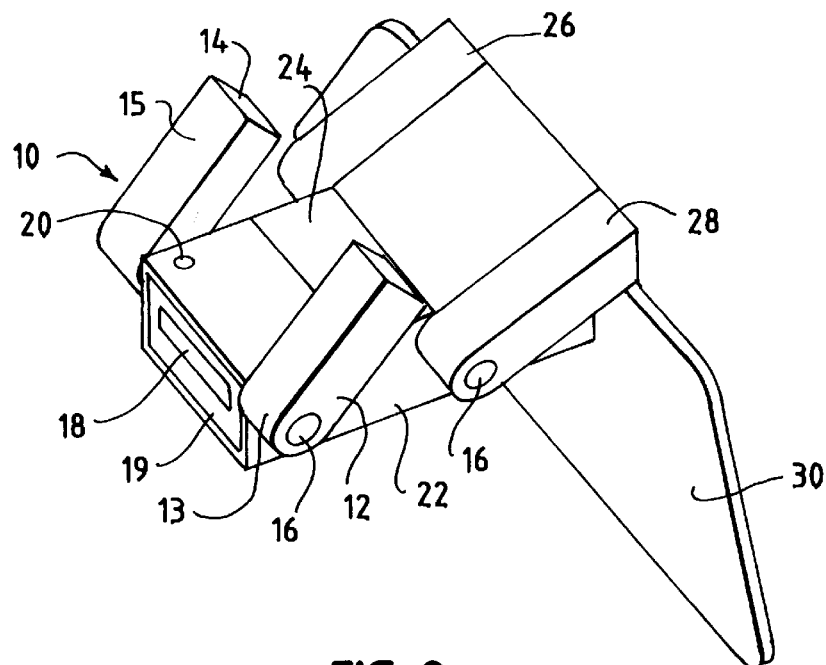
FIG. 1 shows a perspective view of the seat belt monitoring system as appears when it is attached to the front windshield of a vehicle.

FIG. 1 shows a first preferred embodiment of the present invention, seat belt usage monitoring system 10 which has two fairly square stout antenna, distal antenna 12 and 14 at the windshield or distal end of the device. It is anticipated that upper mounting surfaces 13 and 15 are to be coated with a thin layer of high strength adhesive for mounting to the interior surface of a front windshield, in a similar manner as is now accomplished with the stem of a standard rear view mirror. Also directed out the front of the windshield is neon light bulb 18, which is preferably blue in color for attractiveness, and visibility for its relatively long wave length. Blue is a color which tends to denote peace and safety, rather than the bright garish warning light colors of red and yellow which are typically used on emergency vehicles. Of course, other colors may be easily substituted for compliance with the Federal Highway Safety Standards, or as desired by vehicle manufacturers and dealers of after market devices. It is anticipated that the edges of the surface surrounding neon light bulb 18, in the area of periphery 19 will be filled with a sealant or adhesive, or both, to prevent glare entering the interior of the vehicle during evening or night time. This is well known in the art and is a technique used for rear center brake lights where they are secured directly to the back interior of a vehicle's rear windshield.

Body 22 is preferably made of an extremely tough plastic polymer or copolymer inasmuch as it is intended to support mirror 30, as well as securely retain GPS circuitry and an erasable encodable programmable read only memory (EEPROM). It is anticipated that the EEPROM will be secured in removable memory storage unit 24 for later retrieval by law enforcement personnel after an accident. This memory storage unit 24 may be secured with a special lock and key (not shown), or it may merely separate from the body with a special tool retained only by appropriate personnel. It is important that the unit is not tampered with in any manner, inasmuch as it may be used to determine accident liability (high speed, traveling in the wrong direction, in the wrong lane, etc.) as well as report back to an insurance company the relative rate of seat belt usage by the driver and/or vehicle occupants. As a result, the body 22 should be extremely resistant to water, fire and shock. If the windshield breaks, the body 22 may be separated or thrown a distance, but nonetheless body 22 should be sufficiently tough so as to protect the data contained therein.

A photovoltaic cell 20, may be coupled to neon light bulb 18 to adjust its brightness to lighting conditions. The photovoltaic cell 20 preferably points upwards so that it will not become inaccurate due to oncoming headlights, billboards, and other misleading indicators of ambient lighting conditions. The adjustment of neon light bulb 18 which is used as projecting forward (or forward and downward, if it is desired to avoid glare to oncoming traffic), as an indicator of seat belt use is necessary so that oncoming traffic will not be disturbed by an unnecessarily bright light during the day, or the traffic will not be able to notice a too dim bulb during the darkest night on country roads. The proper setting for the bulb is important for it to be used as a reminder to oncoming traffic drivers and passengers as a passive reminder to buckle up.

Figure 2:
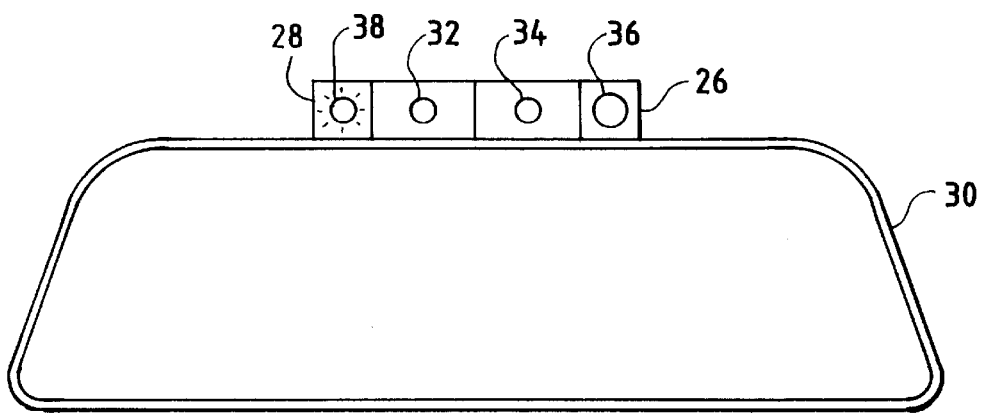
FIG. 2 shows a front elevational view of the seat belt monitoring system behind the rear view mirror of a vehicle.

Two proximal antennas 28 and 26 are also required to be able to receive a strong GPS signal at all times and must be positioned to accurately retrieve directional information. These relatively thick stout proximal antennas, 28 and 26, extend rearwardly of the vehicle and terminate near the same location as rear view mirror 30. As seen in FIG. 2, they are raised slightly above the upper edge of mirror 30, so that controls and lighting are accessible to the passenger/driver area.

FIG. 2 shows the top of the device, with proximal antenna 28 to the left of the car interior, and proximal antenna 26 located to the right of the car interior. In one preferred embodiment of the invention, left proximal antenna 28 is provided with a rear indicator light 28 which is preferably made from an LED or "light emitting diode" or laser, as desired, and may be red in color, due to the importance of the indicator's significance; that is, that at least one seat belt is not in proper use. It is believed that a laser light may be optimally effective at transmitting the signal that at least one belt is not properly used rearwardly through the rear windshield for best visibility. In this particular embodiment of the invention, right proximal antenna 26 is further equipped with an optional push button 36 which the driver, upon entering the vehicle, or at anytime during operation of the vehicle, may push which will turn off rear indicator light 28 signaling that all seat belts are in proper use. In such a manner, the driver and/or passengers can elect not to alert others, including law enforcement personnel, that the seat belts are not in proper use. Of course, the GPS circuitry and the EEPROM are still recording the fact that the seat belts were not in use during the mileage in question and that the driver/passenger made a conscious decision to override the system.

Figure 3:
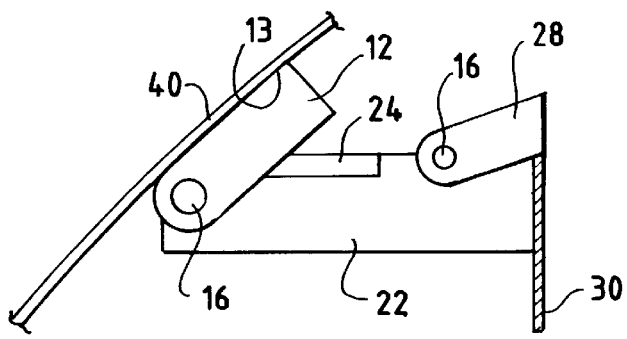
FIG. 3 shows a side elevational cross sectional view of the seat belt monitoring system as it is installed against the front windshield glass.

FIGS. 3 shows a side view of the instant invention, where it is clearly shown how upper mounting surface 13 lies flush with interior of front windshield 40. In such a manner, rear light indicator 28 can be clearly seen through the back of the vehicle. Also, hinges 16 are provided on each of the four antenna, 12 and 14, 26 and 28 so that the rear view mirror 30 can be adjusted as desired by the driver. Also shown in side view is the removable memory storage unit 24 as well as the attachment of rear view mirror 30 flush to monitor housing or body 22.

Figure 4:
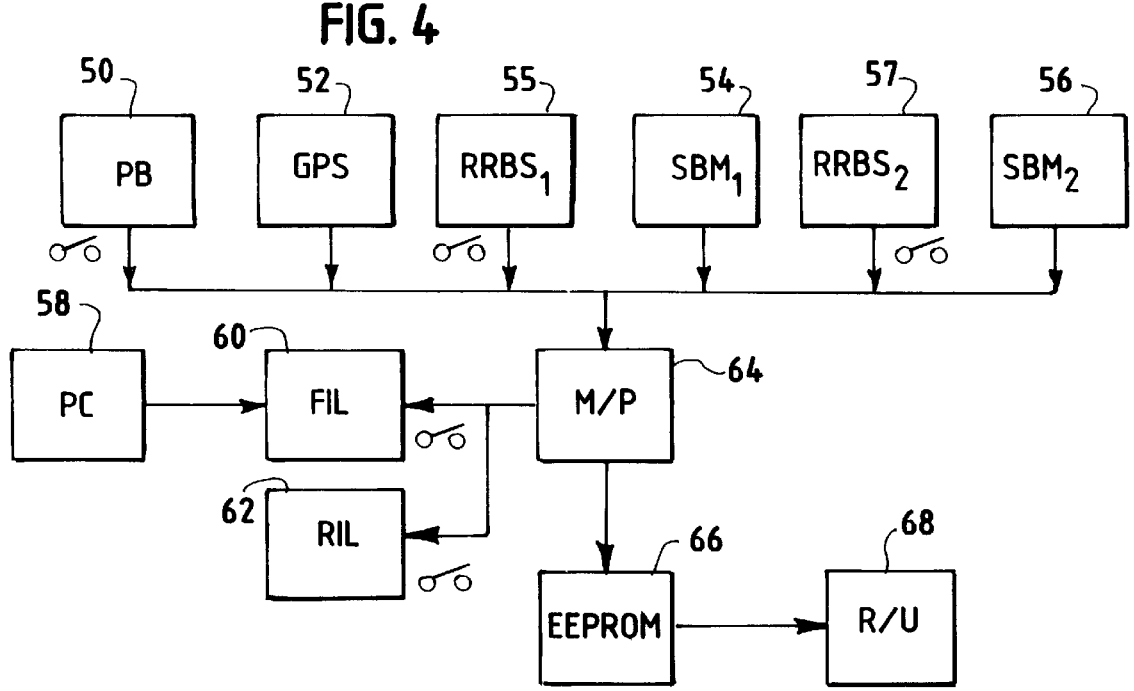
FIG. 4 shows a block diagram of the electrical and electronic components of the seat belt monitoring system.

FIG. 4 shows a block diagram of the electrical and electronic system for seat belt usage monitoring system 10. In this diagram, GPS circuitry 52 is linked directly to the microprocessor 64 to input velocity, longitude and latitude, travel duration, direction and real time. This information is summarized by the microprocessor 64 and is stored in erasable encodable programmable read only memory unit 66. In a preferred embodiment of the present invention, the microprocessor 64 can also control other various functions of the device, and it can receive input from pressure retro-reflective body sensor ① 55 and retro-reflective body sensor ② 57 which, when an on condition is noted, it will trigger seat belt monitor ① 54 and seat belt monitor ② 56 to determine if the seat belts are being used properly. If so, the appropriate data signal is sent back to micro processor 64. In this instance, it is anticipated that retro-reflective body sensor ① 55 and retro-reflective body sensor ① 54 are for the driver's seat; while retro-reflective body sensor ② 57 and retroreflective body sensor ② 56 are for the passenger's seat. When the seat belt monitoring system 10 is installed in a vehicle with a larger number of seats, it is anticipated that there will be a corresponding number of seat belt monitors and retro-reflective body sensors to accommodate each vehicle seat, all of which will be linked to the microprocessor 64 for appropriate control thereof.

FIG. 2 also depicts how, when all the seat belts are in proper use, the front indicator light 18 is switched on and projects directly out or downward of the front windshield for viewing from oncoming traffic, and the rear indicator light 28 projects out the back windshield for viewing by the traffic behind the vehicle. Of course, front indicator light 18 is connected either directly to a photovoltaic cell 20 for appropriate dimming (shown) or it may even be linked directly to the microprocessor 64 and then back again to the front indicator light for "smart" adjustment for different lighting conditions.

Figure 5:
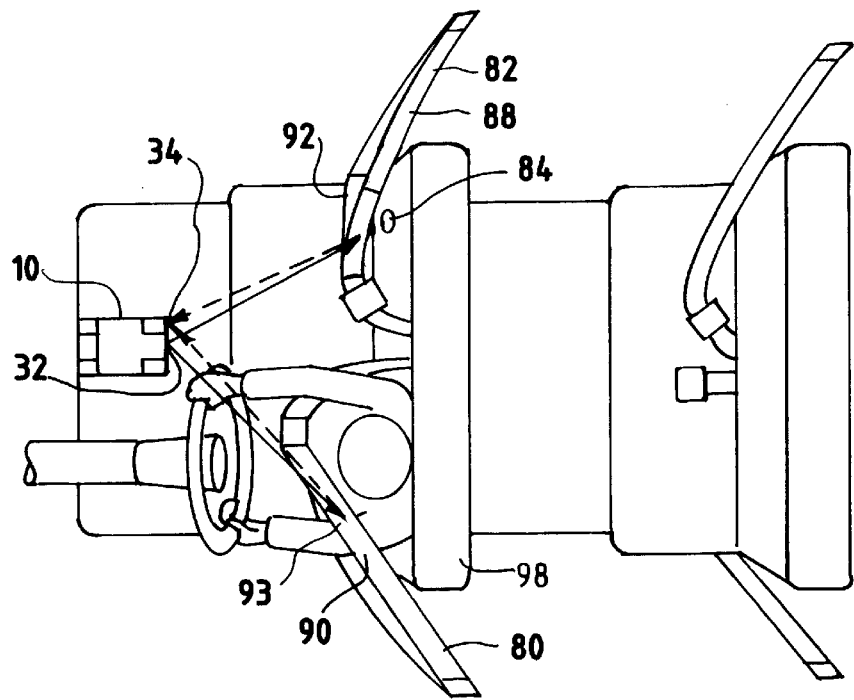
FIG. 5 shows a top partial cut away view of the seat belt use detection system as it is installed in a vehicle.

FIG. 5 shows a top view of the interior of the vehicle and shows a detail of the operation of the seat belt usage detection system 75 wherein is shown the driver's seat belt 80 as it is properly fastened across the driver and the passenger seat belt 82 which has been improperly fastened across an empty seat, presumably for the passenger to enter the car, sit on the seat belt, and attempt to hopefully fool the seat belt detection system 75. However, this will not happen. Seat belt usage monitoring system is continually emitting an IR signal to retro-reflective body sensor 84 which is located behind the passenger in seat back. When it can no longer detect reflection of an IR signal from retro-reflective body sensor 84, microprocessor 64 then triggers IR emitter 32 to send out a signal focused on hot spot 92. If the seat belt were in proper use, retro-reflective material 88 located on the shoulder portion of seat belt 82 would reflect the IR signal properly back to the IR receiver 34. However, in this instance the IR signal is not reflected properly back as it has missed hot spot 92 entirely. Thus, an appropriate updated signal is sent to the microprocessor 64 and the front indicator light 18 is switched off whereas the rear indicator light 38 is switched on, unless and until someone depresses switch 36 located above rear view mirror 30, to override the system. Of course, it is hoped that it will be easier for the non-buckled individual to simply make it a habit to buckle up. But most importantly, the individual is given this choice, and so there is no reason to tamper with the system by permanently disarming it.

Similarly, on the driver's side, proper operation of the seat belt detection system 75 is shown. When the car is turned on, seat belt monitoring system 10 is continuously emitting an IR signal to a retro-reflective body sensor which is located behind the driver in the central portion of the seat back. When monitoring system 10 can no longer detect an IR signal returning from the retro-reflector because it has been blocked by the driver entering the vehicle, IR emitter 32 will begin to direct an IR signal to the hot spot 92 located in front of the driver. Since retro-reflective material 90 has been woven into driver seat belt 80, this retro-reflective material 90 now reflects the IR signal back to IR detector 34 which signals microprocessor 64 that the driver's seat belt 80 is now in proper use. As a result, the front indicator light, neon light bulb 18 is switched on, while the rear indicator light 38 is switched off. Oncoming traffic can be reminded that occupants of this vehicle are all using their seat belts properly, and traffic behind the vehicle will not be alerted to the fact that some or all of the seat belts in the vehicle are not in proper use.

It should be noted that in two different forms of shoulder belt retro-reflective means have been used. On the passenger seat belt 82, a rectangle of material has been directly attached to the belt 82 by either sewing it or gluing with a strong fabric adhesive. In such a manner, seat belt monitoring system 10 can be easily installed as an after market device. As an alternative, and in the case of a new vehicle, it is shown in the driver's seat belt 80 how retro-reflective material 90 can be directly woven into the seat belt.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. A seat belt usage event data recorder monitoring system having an exterior housing for a vehicle comprising:

a GPS circuit which retrieves from one or more satellites data including at least one of the following data: longitude, latitude, velocity, distance traveled, direction of travel and time;

means for detecting seat belt use by at least one occupant of a vehicle;

display means for providing a visual indication when at least one seat belt in the vehicle is being improperly used;

a microprocessor which receives data from the GPS circuit and from the means for detecting seat belt use on a substantially continuous basis in real time;

data storage means which stores data on a substantially continuous basis from the GPS circuit, the means for detecting seat belt use, and the locations at which improper seat belt usage was detected, all of which data was processed by the microprocessor for storage and later retrieval and analysis; means for switching off said display means by an occupant of the vehicle, although storing of locations of improper seat belt use may continue, the housing for the monitoring system further having a substantially planar surface which is suitable for mounting to the interior of a windshield of a vehicle.

2. The monitoring system according to claim 1 wherein the vehicle has a rear view mirror and the microprocessor and the data storage means are positioned within the housing so as not to obscure the vision of a driver.

3. The monitoring system according to claim 2 wherein the vehicle has a front windshield and the monitoring system is further provided with a front indicator light viewable through the front windshield to oncoming traffic wherein the front indicator light is turned on when at least one vehicle occupant is properly buckled up.

4. The monitoring system according to claim 3 wherein the front indicator light comprises a neon light bulb.

5. The monitoring system according to claim 4 wherein the neon light bulb is blue in color.

6. The monitoring system according to claim 1 wherein the vehicle has a rear windshield and the system is further provided with a rear indicator light viewable through the rear windshield to traffic behind it.

7. The monitoring system according to claim 6 wherein the rear indicator light comprises an LED or laser light source.

8. The monitoring systems according to claim 1 where the erasable, encodable memory storage means is easily detached from the GPS circuit, when desired.

9. The monitoring system according to claim 6 further having a switch wherein the rear indicator light located inside the cabin of the vehicle may be switched off by the driver regardless of proper seat belt use.

10. The monitoring system according to claim 1 where the vehicle has seats and seat belts with shoulder straps wherein the means for detecting seat belt use comprises:

means for determining whether a person is sitting in a particular seat;

an infrared emitter;

an infrared detector positioned directly adjacent the emitter, retro-reflective material positioned on the shoulder straps of the seat belts wherein when at least one seat belt is properly buckled in place, an infrared signal will reflect off of the reflective material back to the infrared detector indicating proper seat belt usage.

11. A method for determining seat belt usage in a vehicle by providing a GPS circuit which retrieves from one or more satellites at least one of the following datum: longitude, latitude, velocity, distance traveled, direction of travel and time;

providing means for detecting improper seat belt use by at least one occupant of a vehicle;

providing display means which indicates improper use of a seat belt by an occupant of the vehicle;

providing switch means whereby a vehicle occupant can turn off the display means;

providing a microprocessor which receives data from the GPS circuit and from the means for detecting improper seat belt use and which microprocessor determines the locations at which improper seat belt usage was detected;

providing data storage means;

providing a housing for the GPS circuit, the microprocessor and the storage means;

securing the housing to the interior of a vehicle windshield;

storing real time data including at least one of the following datum: longitude, latitude, direction of travel and time in the data storage means;

storing real time data including locations at which seat belts were improperly used regardless of whether the display means was turned off by a vehicle occupant;

retrieving data from the data storage means at a later date.

* * * * *